May 6, 1969 H. H. HANLIN 3,442,217

ON-OFF SWITCH FOR ELECTROMAGNETIC PUMP

Filed May 19, 1967

INVENTOR.
HARRY H. HANLIN
BY
[signature]
ATTORNEY 3,442,217
ON-OFF SWITCH FOR ELECTROMAGNETIC PUMP Harry H. Hanlin, Canoga Park, Calif., assignor to the United States of America as represented by the United States Atomic Energy Commission Filed May 19, 1967, Ser. No. 641,424
Int. Cl. F04d 7/00, 13/00
U.S. Cl. 103—1 1 Claim

ABSTRACT OF THE DISCLOSURE

The invention describes a thermoelectric pump which reduces the problem of start-up by using a liquid metal switch to interrupt the thermoelectric circuit during start-up, thereby preventing an unnecessary drain upon the start-up battery.

*Background of invention*

This invention relates to an improvement in electromagnetic pumps, and more particularly relates to a fluid controlled on-off switch for such pumps, especially of the thermoelectric type. This invention was made in the course of, or under, Contract No. AT(11-1)-GEN-8 with the United States Atomic Energy Commission.

Electromagnetic pumps are known in the art. A particular form of such pumps are referred to as thermoelectric pumps as more fully described in U.S. Patent 3,116,693, issued Jan. 7, 1964, in the name of Sol R. Rocklin for Thermoelectric Pump and U.S. Patent 3,288,070 issued Nov. 29, 1966, in the name of M. A. Perlow et al. for Thermoelectric Pump. These pumps have a thermoelectric material adjacent the hot liquid for generating a voltage to pump the liquid.

Electromagnetic and thermoelectric pumps operate on the principle that crossed electric and magnetic field in the presence of a liquid metal result in a pumping force perpendicular to both fields. A distinction exists in that conventional electromagnetic pumps require an external source of current supply, while thermoelectric pumps generate their own current supply from the passage of a hot liquid which is also pumped as a result of the current generated. However, an external source of power may be applied to thermoelectric pumps if desired, especially during start-up.

While such pumps have been unusually successful in the liquid metal arts, they do possess characteristics which require improvements. Some of these characteristics are the large electrical current and magnet requirements, and in the case of thermoelectric pumps, a start-up problem is presented until the liquid metal is sufficiently hot and flowing to generate a thermoelectric current.

One particular problem with the thermoelectric pump has been that, during start-up, the generation of thermoelectric power is difficult because either the liquid metal is "cold" or absent from the pump. Accordingly, an external source of power has been utilized for starting. However, since the thermoelectric circuit is in parallel with the pump circuit, there has been an unnecessary current drain upon the battery.

Another problem with such pumps has been the inability to control them when started because of the difficulty in interrupting or varying large currents of the order of 500 amperes. As a result, switches are not normally used or considered.

*Summary of invention*

One object of this invention is to provide an automatic shut-off or switch for an electromagnetic pump.

Another object is to provide a fluid controlled switch for electromagnetic pumps.

A still further object is to provide a thermoelectric pump for hot liquid metal in which a second liquid metal forms a part of the electric circuit so that control of the second fluid may operate as an on-off switch or as a fluid velocity control for the pump.

Another object is to eliminate the start-up problems of a thermoelectric pump.

The problems of the prior art are solved according to this invention by the provision of a switch having a secondary liquid metal interposed in the thermoelectric circuit of the pump so that by varying the secondary liquid, fluid velocity control is obtained. This secondary fluid may be independent of the primary fluid being pumped, or may be the return path for such primary fluid.

For a more detailed description of the invention, reference is made to the drawings, in which.

*Description of the preferred embodiment*

Figure 1:
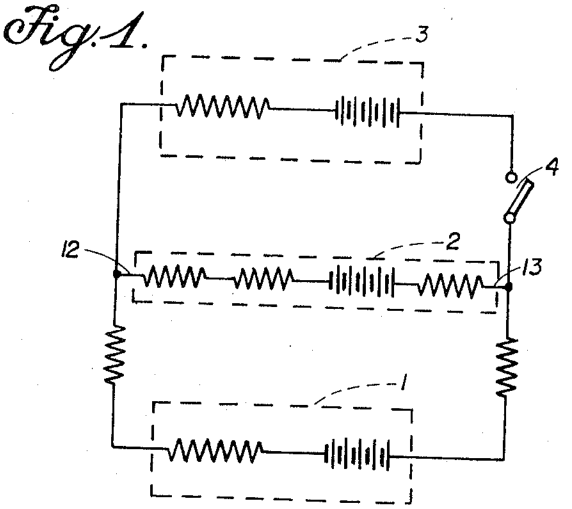
FIGURE 1 is the equivalent circuit of a thermoelectric pump.

FIGURE 1 illustrates the equivalent circuit of a thermoelectric pump at start-up. A battery is shown as 1, including its internal resistance. A conventional DC conduction pump is shown as 2. The DC conduction pump physically has two current electrodes for providing a transverse electric current through the liquid, as will be shown in FIGURE 2 in the presence of a magnetic field (not shown), the operation of which is well known.

The equivalent circuit of the pump shows the internal resistance at the electrode contacts, the resistance of the liquid and the voltage drop in the liquid.

In a thermoelectric pump, semiconductive material is placed in thermal contact with the liquid metal and in electrical contact with the pump electrode so that the voltage generated in the semiconductors act as a substitute for the battery. Thus the equivalent circuit 3 for the thermoelectric generator includes its inherent resistance and a battery polarized to produce the same current flow as battery 1 through the pump 2.

The problems presented are apparent when it its considered that the resistance of the pump is only 50 microohms and the current through the pump is of the order of 500 amperes.

It is understood that battery 1 is always necessary for starting and running a conventional DC conduction pump, but that where a thermoelectric generator is employed, the battery 1 is usually not necessary since sufficient pumping power is provided by the thermoelectric generator provided the fluid is sufficiently hot.

In this connection, a problem exists during start-up of the pump or the nuclear reactor which is supplying the liquid metal. The liquid metal could be cold, in which case the battery 1 would be necessary to provide sufficient current to the pump 2. In such a case, the thermoelectric circuit which is in parallel with the pump acts as a shunt drain on battery current. Thus it is desirable to provide a switch 4 to open the thermoelectric circuit during start-up. The switch, of course, has other uses, such as stopping the pump or varying the pump speed when the pump is connected as a thermoelectric pump without connection to the battery.

The design of a switch 4 presents a considerable problem because of the large currents involved, especially since in a space vehicle, size and weight are critical limitations. The solution of the problem is, as shown in FIGURE 2, to provide a unique liquid metal switch.

Figure 2:
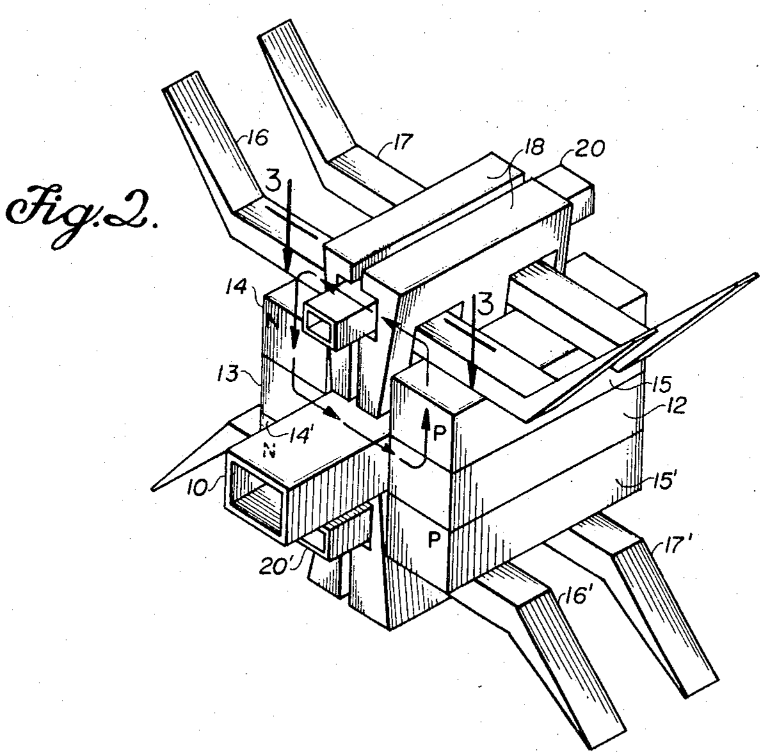
FIGURE 2 is an elevational view of the improved pump.

In FIGURE 2, the primary liquid metal flow path is through the throat 10 of a stainless steel pipe. Current conductive electrodes 12 and 13 are welded or otherwise electrically connected at diametrically opposite portions or sides of the pump throat. These electrodes are positioned for providing a current flow transversely through the primary liquid metal. In a pure electromagnetic pump, electrodes 12 and 13 would be connected to an external source of DC current, as shown in FIGURE 1.

In the thermoelectric pump shown, current is generated within the pump structure as a result of the temperature gradient across a semiconductive thermoelectric material as discussed in the applications identified, supra.

Thermoelectric semiconductive material of the N and P type are shown at 14 and 15. These materials are both electrically and thermally conductive, and are suitably bonded or brazed both to the electrodes 12 and 13 and the electrically and thermally conductive radiator sections 16 and 17. A portion of the magnet is shown at 18 to provide a magnetic field transverse to the electric field in the primary fluid.

In the normal operation of a thermoelectric pump of this type, a temperature gradient is created across the semiconductor material with a hot junction being formed at the ends of the semiconductor adjacent the throat of the pump, and a cold junction is formed at the other ends of the semiconductor adjacent the radiator. As a result, a voltage is generated which results in the passage of current through the primary liquid metal transverse to its direction of flow in a path including the electrodes 12 and 13, semiconductors 14 and 15, and radiators 16 and 17.

In the improved pump, the electric current return path in the radiator section is interrupted at the cold junction by the insertion of pipe 20 which contains a secondary liquid metal to act as a switch or conductivity control, shown as 4 in FIGURE 1. Pipe 20 may be the return pipe carrying the primary fluid, or it may be an independent pipe carrying a controllable secondary fluid.

Figure 3:
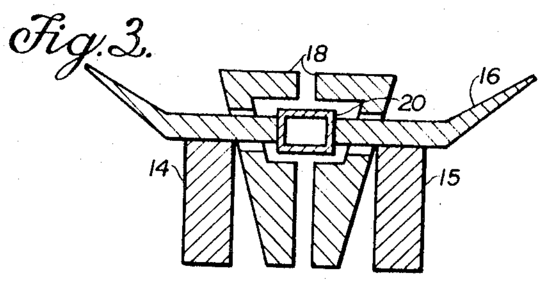
FIGURE 3 is a partial section of the fluid switch.

The switch structure at 20 is more clearly shown in FIGURE 3 which shows a partial sectional view along lines 3—3 in FIGURE 2. The pipe 20 passes through the magnet 18 and is soldered or otherwise electrically connected to the radiator structure 16 so that it completes the electrical circuit including the semiconductors and pump electrodes as shown by the arrows in FIGURE 2. Of course, the pipe 20 could be ceramic with metal electrodes. It should be noted that for purpose of this invention the pipe 20 has sufficient resistance so that it is considered as an open-circuit switch in the absence of liquid. The presence of liquid in pipe 20 causes it to act as an open or closed switch or as a variable impedance, depending upon the amount of fluid therein.

The source of fluid for pipe 20, of course, depends upon the application of the pump. In some instances, a separate source of liquid metal may be used for controlling the switch. In other instances, such as in a nuclear reactor where there are primary and secondary liquid metal paths, one of these sources may be used to provide automatic control.

In particular, in a nuclear reactor where primary sodium flows through the reactor to an intermediate heat exchanger where heat is exchanged with a secondary sodium fluid flow, the secondary sodium may flow through pipe 20 to act both as a control and also as a heat exchange mechanism with the primary fluid since all the parts of the pump conduct both thermally and electrically.

What is claimed is:

1. An electromagnetic pump comprising a direct current conduction pump for pumping a primary fluid, said pump comprising a pipe having, at opposite points on its circumference, input electrodes for receiving direct current from a source, a thermoelectric generator circuit including opposite conductivity type semiconductive material in thermal contact with said primary fluid and connected to said electrodes in thermal and electrical contact to form a hot junction therewith, and switch means, including a secondary liquid metal and a second pipe for transmitting same, said pipe being positioned to electrically complete said thermoelectric circuit at a cold junction, for connecting the output of said generator circuit formed by said input terminals and for varying the direct current supplied thereto from said thermoelectric circuit.

References Cited

UNITED STATES PATENTS

| | | | |
|---|---|---|---|
| 2,971,128 | 2/1961 | Carlson | 335—47 |
| 3,029,323 | 4/1962 | Carlson | 335—47 |
| 3,116,693 | 1/1964 | Rocklin | 103—1 |
| 3,331,937 | 7/1967 | Harvey | 200—152 |

WILLIAM L. FREEH, *Primary Examiner.*

U.S. Cl. X.R.

200—52